United States Patent
Hewitt et al.

(10) Patent No.: US 7,301,510 B2
(45) Date of Patent: Nov. 27, 2007

(54) METHODS AND APPARATUS FOR REDUCING FRAME VIOLATIONS IN A STEREOSCOPIC DISPLAY

(75) Inventors: Gordon S. Hewitt, Trabuco Cnyn, CA (US); John O. Merritt, Williambsurg, MA (US)

(73) Assignee: The Boeing Company, Chicago, IL (US)

( * ) Notice: Subject to any disclaimer, the term of this patent is extended or adjusted under 35 U.S.C. 154(b) by 242 days.

(21) Appl. No.: 10/621,649

(22) Filed: Jul. 16, 2003

(65) Prior Publication Data

US 2005/0012684 A1    Jan. 20, 2005

(51) Int. Cl.
  *G09G 5/00*  (2006.01)
  *G02B 27/24*  (2006.01)
  *H04N 13/02*  (2006.01)
  *H04N 15/00*  (2006.01)

(52) U.S. Cl. .................. 345/9; 345/1.3; 359/472; 348/47

(58) Field of Classification Search .......... 345/1.1–1.3, 345/2.1, 2.2, 3.1, 4–9, 32, 204–206, 214, 345/690, 697; 340/901; 359/376–379, 462, 359/466–473, 476, 477; 348/42, 46–59; 352/57, 58, 61, 63, 65; 353/7; 356/12; 396/324–331
See application file for complete search history.

(56) References Cited

U.S. PATENT DOCUMENTS

| | | | | |
|---|---|---|---|---|
| 4,298,176 A | * | 11/1981 | Kendall | 244/135 A |
| 4,677,468 A | * | 6/1987 | Morishita | 348/47 |
| 5,379,133 A | * | 1/1995 | Kirk | 359/15 |
| 5,486,841 A | * | 1/1996 | Hara et al. | 345/8 |
| 5,872,590 A | * | 2/1999 | Aritake et al. | 348/57 |
| 6,259,426 B1 | * | 7/2001 | Harada et al. | 345/581 |
| 6,580,556 B2 | * | 6/2003 | Kakizawa | 359/462 |
| 6,890,077 B2 | * | 5/2005 | Dunn | 351/224 |
| 2003/0133191 A1 | * | 7/2003 | Morita et al. | 359/464 |
| 2004/0263613 A1 | * | 12/2004 | Morita | 348/51 |
| 2005/0030621 A1 | * | 2/2005 | Takahashi et al. | 359/464 |
| 2005/0083570 A1 | * | 4/2005 | Ueda et al. | 359/384 |
| 2006/0238441 A1 | * | 10/2006 | Benjamin et al. | 345/8 |

OTHER PUBLICATIONS

Cruz-Neira, Carolina, Sandin, Daniel J., Defanti, Thomas A., "Surround-Screen Projection-Based Virtual Reality: The Design and Implementation of the CAVE" The University of Illinois at Chicago, Chicago, IL.

Smart Tanker. Avionics Magazine, [online] Jan. 2003 [retrieved on Jul. 8, 2003].Retrieved from Internet: <URL: www.aviationtoday.com/reports/avionics/previous/0103/0103tanker.htm>.

* cited by examiner

*Primary Examiner*—Jeff Piziali
(74) *Attorney, Agent, or Firm*—Ingrassia Fisher & Lorenz, P.C.

(57) ABSTRACT

Methods and apparatus are provided for reducing frame violations in a stereoscopic display. A stereoscopic display system for presenting a stereoscopic image to a user suitably includes one or more cameras, each providing a video image, and a video processor. A stereoscopic display includes a left module and a right module, with each module having an eyepiece and a display panel with at least one aperture located therebetween. The stereoscopic display is configured to produce the stereoscopic image on the display panels as a function of image data received from the video processor, with the apertures forming a window around at least a portion of the perimeter of the display to thereby provide a visual reference point to the user that reduces or eliminates frame violations. The stereoscopic display system may be used during aerial refueling operations, or in any other display environment.

8 Claims, 3 Drawing Sheets

METHODS AND APPARATUS FOR REDUCING FRAME VIOLATIONS IN A STEREOSCOPIC DISPLAY

TECHNICAL FIELD

The present invention generally relates to stereoscopic displays, and more particularly relates to preventing frame violations on stereoscopic displays.

BACKGROUND

Stereoscopic images provide three-dimensional (3D) representations of objects and scenes using multiple two-dimensional (2D) images. Stereoscopy has been commonly used in motion pictures, holography, photography, and other fields for many years. As the quality of stereoscopic imagery has improved, it has become increasingly adopted in many environments. Stereoscopic imagery is now used, for example, during aerial refueling to aid in directing the refueling boom toward the fuel receptacle of the refueling aircraft. Numerous other applications of stereoscopic imagery are found in a wide array of entertainment, commercial, military, medical, aerospace, and other settings.

Typically, stereoscopic images make use of 'binocular vision,' which incorporates at least two separate images taken at different viewing angles corresponding to the different angles of vision produced by a viewer's two eyes. Upon viewing, the two images are isolated from each other (using various physical, optical and/or other techniques) such that each of the viewer's two eyes receives only one of the two images, creating separate left-eye and right-eye retinal images. When viewed in this manner, the human brain uses the differences between the separate left-eye and right-eye images as cues to the three-dimensional position of objects in the scene, thereby producing the visual percept of objects seen in various 3D positions in front of the observer's eyes.

One problem commonly associated with stereoscopic images, however, involves difficulty in framing the various objects within in the confines of the two-dimensional representation. So-called "frame violations" typically result when objects appearing in front of the viewing surface ("the frame") are clipped off by the edge of the display frame, thereby giving the illusion that closer objects are blocked by a surface that appears to be behind the closer object; this is contrary to the normal experience of interposition, where closer objects block the view of farther objects. In the case of mid-air refueling, for example, the refueling boom may appear in front of the stereo window (formed by the edge of the display, typically a panel-mounted flat panel display), thereby creating the potential for an unnatural appearance when a portion of the boom appears to be obscured by the display edge "behind" the boom. The visual paradox created by this occlusion of the stereoscopic frame potentially contradicts the binocular disparity of the stereoscopic image in the viewer's mind, thereby disturbing the viewer's accurate perception of three-dimensional position in space.

Accordingly, it is desirable to create a stereoscopic display that reduces or eliminates stereoscopic frame violations. In addition, it is desirable to create a stereoscopic viewing system suitable for use in aerial refueling that reduces or eliminates stereoscopic frame violations. Furthermore, other desirable features and characteristics of the present invention will become apparent from the subsequent detailed description and the appended claims, taken in conjunction with the accompanying drawings and the foregoing technical field and background.

BRIEF SUMMARY

Methods and apparatus are provided for reducing frame violations in a stereoscopic display. According to various embodiments, a system for presenting a stereoscopic image to a user suitably includes one or more cameras, each providing a video image to a video processor, and a stereoscopic display. The stereoscopic display suitably includes a left module and a right module, with each module having an eyepiece and a display panel with at least one aperture located therebetween. The stereoscopic display may be configured to produce stereoscopic image pairs on the display panels as a function of image data received from the video processor, with the apertures forming a window around at least a portion of the perimeter of the display to thereby provide a visual reference point to the user that reduces or eliminates frame violations. The stereoscopic display system may be used during aerial refueling operations, or in any other display environment.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. As used herein, the term "substantially" is intended to incorporate deviations from the parameters set forth herein to accommodate design and manufacturing variations, as well as literal deviations of ten percent or more that do not deviate from the concepts as set forth herein and their legal equivalents.

According to various exemplary embodiments, a stereoscopic viewing display reduces or eliminates frame violations by providing a "mid-window" that conceals at least a portion of the edge of the display and provides viewers with a familiar optical reference point. The "mid-window" may be provided through mechanical or electronic techniques. One or more apertures, for example, may be placed between each eyepiece and display screen in a stereoscopic viewer to create the appearance of a window frame in front of the display that provides natural focus and binocular fixation cues that are similar to looking out a direct viewing window at a distant scene. In a further embodiment, a stereoscopic display system may be configured such that the cameras obtaining stereo images converge at a point closer to the camera than the primary objects of interest in the viewed scene, such that the objects of interest appear to extend "behind" the point of convergence, thereby further ensuring that no objects extend in front of the window to create frame violations. The various viewing displays described herein may be used, for example, in the context of an aerial refueling system or any other aeronautical, industrial, entertainment, or other commercial application.

Figure 1:
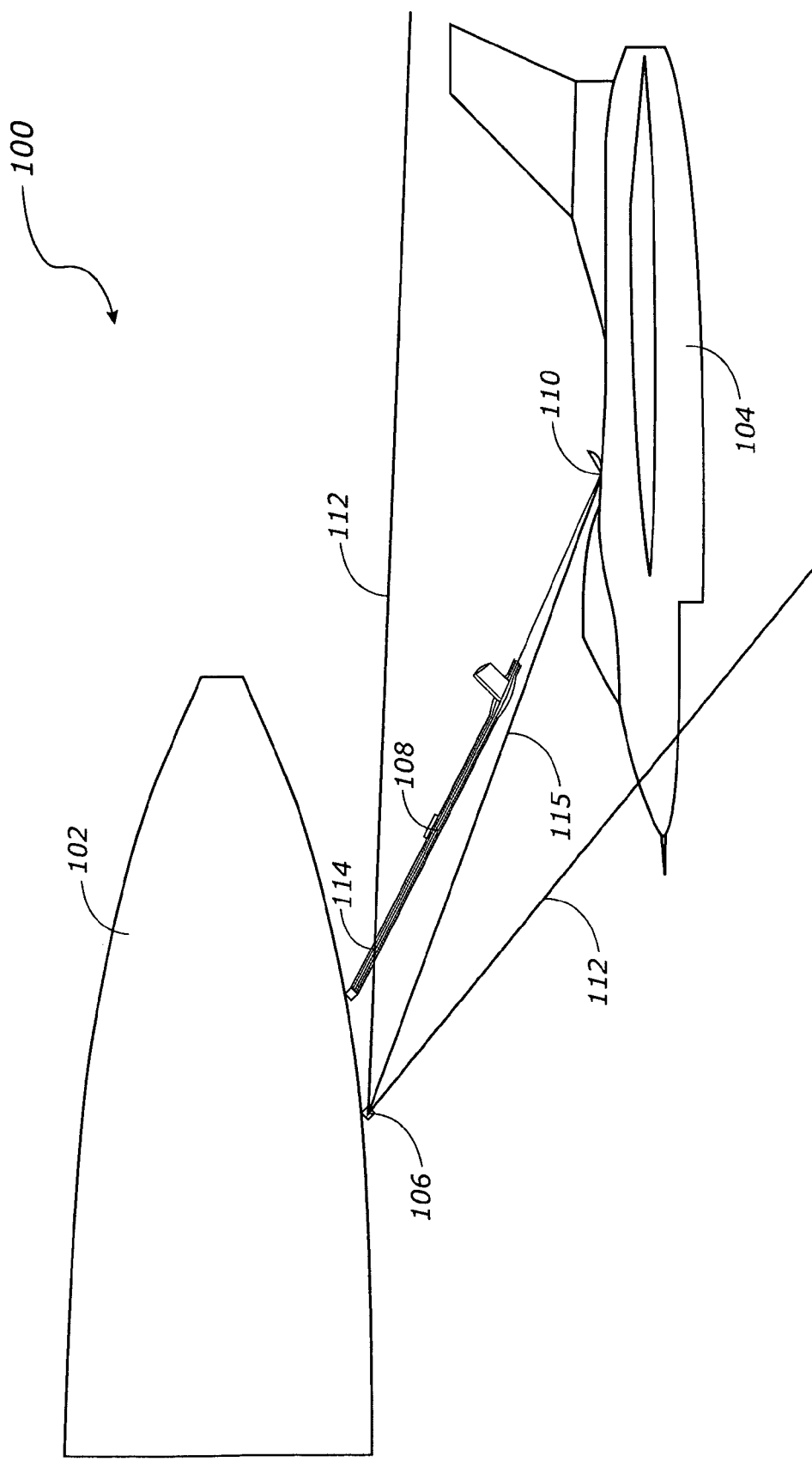
FIG. 1 is a block diagram of an exemplary aerial refueling environment using stereoscopic imaging.

Turning now to the drawings, FIG. 1 shows an exemplary layout for an aerial refueling environment 100. A tanker aircraft 102 suitably provides fuel to a fuel-receiving aircraft 104 via a refueling boom 108. During the refueling process, an operator on tanker aircraft 102 appropriately directs boom 108 toward a fueling receptacle 110 (such as a universal aerial refueling receptacle slipway installation (UARRSI) or the like) on refueling aircraft 104 as appropriate. While early refueling systems (e.g. those on Boeing 707/KC-135 airframes and the like) frequently required operators to remain in cramped, uncomfortable positions for relatively long periods of time to direct the boom from a window at the tail end of the aircraft, modern refueling systems (e.g. those based on Boeing 767-200 and other aircraft) allow the aerial refueling operator (ARO) to control the boom from the relative comfort of the front of the aircraft using remote viewing capabilities. Such capabilities are facilitated using one or more cameras 106 located near refueling boom 108 and providing a video field-of-view (FOV) 112 on either side of a centerline 115 that incorporates refueling boom 108 and at least a portion of receiving aircraft 104. Using video images obtained from cameras 106, the AOR (also referred to herein as "operator", "viewer" or "observer") is able to guide boom 108 toward fuel receptacle 110 and to place and retain boom 108 in the desired position during refueling as appropriate.

As briefly mentioned above, many refueling environments 100 now incorporate stereoscopic imaging to further assist the AOR in guiding the boom. In the past, such display systems typically provided stereoscopic images on panel-mounted displays that employed electrically-switchable polarizing shutter screens over cathode ray tube (CRT) faceplates. Operators typically viewed the images using passive polarized glasses to separate the left and right-eye images. To reduce the effects of cross-talk (i.e. image "ghosting" between left and right images), the cameras were typically converged at the average distance to refueling receptacle 110 (e.g. about sixty feet), which is the primary object of focus. This arrangement potentially resulted in frame violations, however, as images of boom 108 (which is almost entirely in front of the point of convergence, and therefore appeared in "front" of the display frame) became obscured by the display edge at the point where boom 108 left the camera's field of view 112 (e.g. at point 114 on FIG. 1).

More recently, some of the panel mounted displays in aerial refueling systems have been replaced by helmet or head mounted displays (HMD) that incorporate separate viewing channels ("modules") for the left and right eye, thereby eliminating the possibility of cross-talk between channels. Such displays may be readily fitted with apertures, protrusions or other physical elements that obscure edge or other appropriate portions of a miniaturized display to create a "mid-window" that effectively reduces or eliminates frame violations by blocking the portions of the display where frame violations may otherwise occur, and by presenting the viewer with the impression of looking out a traditional viewing window. The mid-window effect may be further enhanced by converging the cameras 106 at a point that is closer than the objects of interest in the captured scene. Cameras 106 are appropriately oriented to converge at some point, as reflected by the intersection of the centerlines 115 projecting from each of the cameras 106. By converging the cameras at a distance that is approximately equal to (or less than) the distance from the cameras to the point where boom 108 comes into field-of-view 112, for example, objects in the captured scene will all appear to be "behind" the plane of the display. Camera convergence points may be selected at any point within field of view 112, depending on the particular implementation. This phenomenon is described more fully below in conjunction with FIG. 3.

Figure 2:
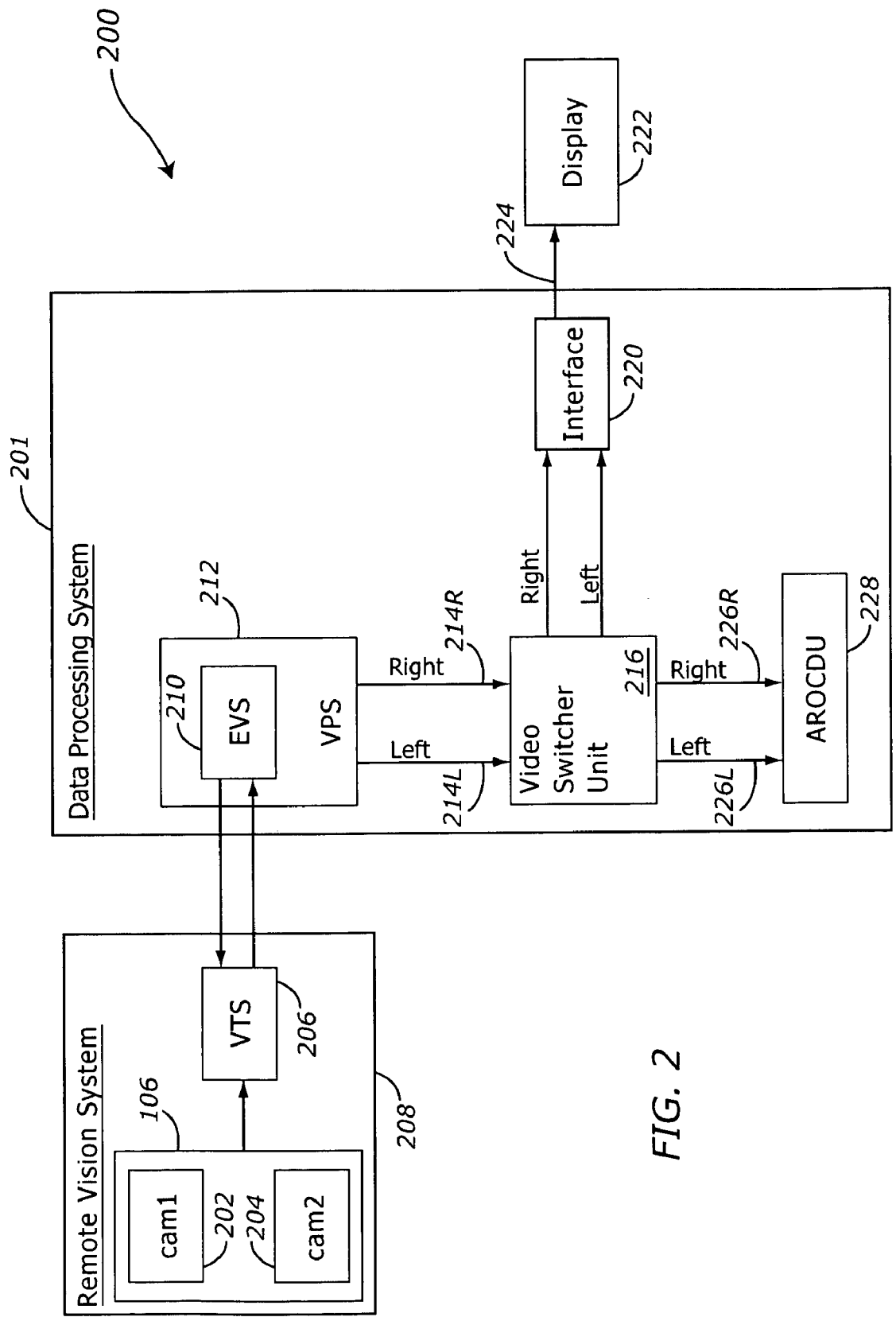
FIG. 2 is a block diagram of an exemplary video processing system for stereoscopic images.

With reference now to FIG. 2, an exemplary stereoscopic video processing system 200 suitably includes a remote vision system 208, a data processing system 201 and one or more stereoscopic displays 222. Remote vision system (RVS) 208 suitably includes at least two cameras 202, 204 providing video images of scene of interest (e.g. boom 108 and aircraft 104 shown in FIG. 1) as well as a video transmission system (VTS) 206 capable of interfacing with cameras 202, 204 to provide video data and to receive control instructions from data processing system 201. While stereoscopic images typically require at least two distinct images for binocular vision, any number of cameras could be included in alternate embodiments. Further, remote vision system 208 may optionally provide additional functionality, such as an aft panoramic vision system, situational awareness camera system (SACS) or the like. In an exemplary embodiment, cameras 202, 204 are digital video cameras providing digital images in any format that are transported via VTS 206 to data processing system 201 via any optical or electrical medium such as an optical fiber or the like. Alternatively, cameras 202, 204 could be analog video cameras providing data to data processing system 201 via an analog-to-digital converter (not shown) or the like.

Data processing system 201 is any data processing system or device capable of obtaining video images from RVS 208 and of processing the images to produce stereoscopic image data that can be displayed on display 222. Examples of suitable data processing systems 201 include the Remote Aerial Refueling Operation (RARO and RARO II) systems available from the Boeing Company of Long Beach, Calif. Such systems typically include a video processing system (VPS) 212 that provides video signals to display 222 and/or to an operator display panel 228 via a video switcher unit 216. In an exemplary embodiment, video processing system 212 is implemented with digital signal processing hardware and/or software capable of processing the separate video streams from cameras 202, 204 to create stereoscopic images. VPS 212 may also provide image enhancements such vertical and/or horizontal scales to indicate the boom's extension and/or azimuth, respectively, as well as indications of fuel flow rate, elapsed time and/or other relevant data. In an exemplary embodiment, VPS 212 includes an enhanced viewing system (EVS) 210 that provides special processing for stereoscopic images. Additionally, VPS 212 may include processing modules for system awareness or other functions as appropriate.

Image data processed by VPS 212 may be provided in any format to one or more display devices as appropriate. In an exemplary embodiment, stereoscopic data is provided in separate left and right channels 214L and 214R to a video switching unit 216, which appropriately directs the image data toward an operator panel display 228 and/or stereoscopic display 222 as appropriate. In an exemplary embodiment, operator panel display 228 is an aerial refueling operator control display unit (AROCDU) provided with the RARO II system and receiving image data on signal lines 226L-R.

In an exemplary embodiment, stereoscopic image data is provided to display 222 via an appropriate video interface 220. Interface 220 may incorporate any type of mechanical, electrical and/or optical connections to display 222. Interface 220 may be compatible with the Digital Video Interface (DVI) specifications (e.g. the DVI 1.0 Specification) available from the Digital Display Working Group of Santa Clara, Calif., for example, which typically operate at a frame rate of about 60 Hz. Interface 220 also provides electrical power to display 222 from the aircraft power bus system or another appropriate source. Although power requirements vary widely from embodiment to embodiment, in one exemplary embodiment interface 220 provides single phase power at about 400 Hz with a maximum current of about one ampere and voltage limits of about 105-125 VAC.

Display 222 is any display capable of receiving image data from video processing system 212 via signal path 224 and of presenting stereoscopic images to a viewer as appropriate. In an exemplary embodiment, display 222 is a head-mounted display (HMD) as may be available from several commercial vendors (including the Kaiser Electronics division of Rockwell Collins, Inc., of San Jose, Calif.) configured as set forth below. While the stereoscopic display is frequently described herein as a HMD, similar concepts could be applied in equivalent display components such as CRTs, plasma displays, flat panel displays and the like.

Figure 3:
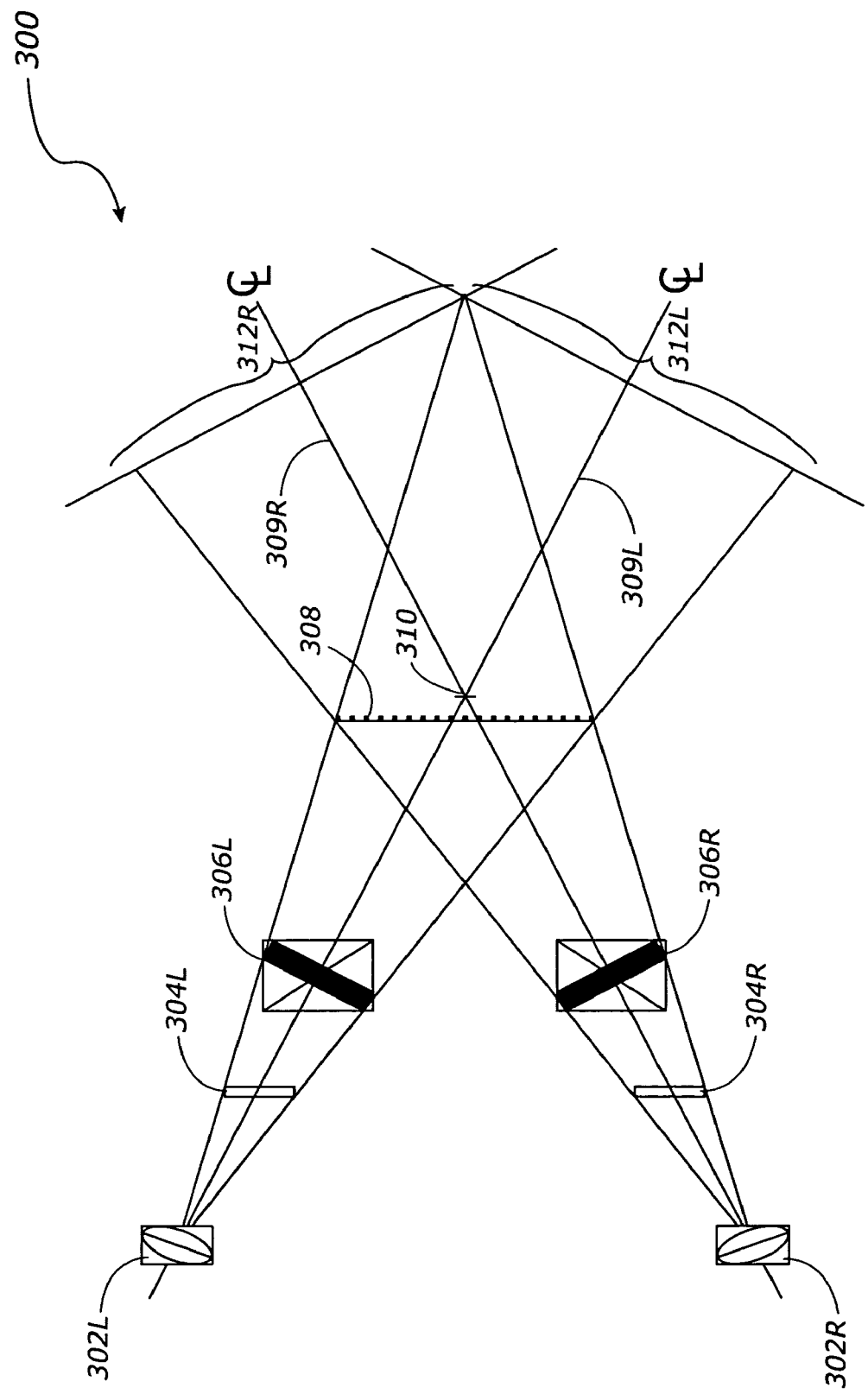
FIG. 3 is a block diagram of an exemplary stereoscopic display.

With reference now to FIG. 3, an exemplary display 300 corresponding to display 222 or display 228 in FIG. 2 suitably includes an aperture or other structure concealing some or all of the periphery of the display to reduce or eliminate frame errors. Although the exemplary display 300 shown in FIG. 3 includes viewing modules 312L and 312R corresponding to the viewer's left and right eyes for binocular vision, the concepts described herein could be applied to any display having any number of viewing channels for viewing stereoscopic images. Each viewing channel suitably includes a an eyepiece 302 and a miniature video display 306 capable of displaying digital images based upon the image data received from video processing system 212 (FIG. 2). Each eyepiece 302L-R contains appropriate lenses, prisms and/or other optical components to properly focus the viewer's eye upon the images presented on display 306 as appropriate. In embodiments using only a single display, polarizing or filtering glasses may serve as equivalents for eyepieces 302. Displays 306L-R are any displays capable of presenting visual data to the observer. In an exemplary embodiment, displays 306 are 1024 pixel flat panel displays, although displays of any construction or resolution could be used in alternate embodiments. As briefly explained above, each channel 312 presents a simulated view from each eye that is physically isolated from the other eye's view, but that is 'blended' to create a binocular 3d effect in the viewer's mind. Alternatively, each channel 312 provides a separate image from a stereoscopic image pair that is shown with the other image on a common display 306, but with the two images isolated from each other by filtering glasses, eyepieces or the like.

Frame violations in display 300 may be removed by any technique. In an exemplary embodiment, hardware or software in display 300 provides a "mid-window" 308 that conceals or otherwise obscures the outermost edges of displays 306L-R. Frame violation issues may be identified and obscured using software executing in display 300 and/or in VPS 212 (FIG. 2), for example, by simply blocking out those pixels in display 306 that would otherwise show "incorrect" data. This technique may be disadvantageous in some embodiments, however, because darkened or blocked out pixels typically appear sharply in focus when viewed through display 300. Just as real world objects on the periphery of a viewer's focus (e.g. a window pane) appear slightly distorted when the viewer is focused on a distant object (e.g. an object seen through the window), it is desirable for objects on the periphery of the viewer's focus in display 300 to appear slightly distorted. If the user is attempting to focus on an object seen through the virtual mid-window 308 rather than on the window itself, the sharp focus created by software correction may be distracting because the viewer expects the objects on the periphery of vision to be at least slightly blurred.

Alternatively (or additionally), one or more viewing modules 312 of display 300 may be configured to include one or more physical apertures 304 or other structures to create the "mid-window" effect 308 in front of the stereoscopic image 310. Because apertures 304 are located between eyepieces 302 and display screens 306, the optical distance of the mid-window is closer than the optical distance of the display screen pixels. Just as an actual window is closer than the objects seen through the window, "mid-window" 308 appears to the viewer as being in front of the objects presented by display screen 306. If the aperture is appropriately sized to obscure some or all of the perimeter of display screen 306, framing issues are effectively reduced or eliminated. In an exemplary embodiment, apertures 304L-R are appropriately sized to conceal the outermost pixels (e.g. the outermost two pixels or so) from the perimeter of displays 306L-R, although other apertures 304 may be differently configured (e.g. to conceal between 1-10 pixels or so) in alternate embodiments. Moreover, because the aperture is physically distinct from the video display, mid-window 308 will appear to the viewer to be appropriately blurred when viewed at the periphery of vision, thereby eliminating the focus mis-cues found in certain electronic implementations. Although FIG. 3 shows only one aperture 304 in each viewing module 312, alternate embodiments may create mid-window 308 using any number of apertures arranged in any manner. Similarly, although FIG. 3 shows the apertures 304L-R located approximately midway between eyepieces 302L-R and displays 306L-R, apertures 304L-R may be located at any point between the eyepieces and displays in alternate embodiments. Apertures 304L-R may be formed of any opaque material such as plastic, metal, cardboard or the like.

By properly adjusting the cameras and viewing modules in a stereographic imaging system, effective visual representations of refueling and other scenes can be provided without frame violation issues. The particular dimensions, spatial layouts and orientations used will vary widely from embodiment to embodiment. For purposes of illustration, however, additional detail follows for one exemplary embodiment used for aerial refueling control. In this exemplary embodiment, the left and right cameras (e.g. cameras 106 in FIG. 1) may be separated by a distance of about 17 inches, which provides a scale factor of about 6.8 times normal human eye inter-pupillary distance (IPD). The cameras may be "owed-in", or oriented slightly toward each other, by about 9 degrees or so to create a convergence point at a distance of about 8.7 feet or so from the camera, which may be less than (or approximately equal to) the distance from cameras 106 to the point where the refueling boom intersects the upper edge of the camera's field of view (point 114 in FIG. 1). To reduce distortion in binocular visual space, it may be desirable to also "tow-in" each of the video displays 306L-R by a similar angle of approximately 9 degrees. In such an embodiment, display 300 may be configured to have an optical distance (e.g. distance to a focus point) of about 0.6 diopters (about 65.6 inches) from the eyes, with a 46.5 degree horizontal field-of-view subtended by the central pixels in each eye's virtual display screen 306. Assuming a 2.5 inch average IPD for the observer, the viewing modules 312 of display 300 will converge at a display convergence point 310 (i.e. a point corresponding to the intersections of the centerlines 309 projecting from each module 312) about 15 inches from the mid-point between the observer's eyes. Although conventional HMD design would dictate that the focus point and convergence point should coincide, the two points are distinct in this embodiment to provide a larger, comfortable 3D depth, viewing volume, with the greatest visual clarity upon the points of greatest interest (e.g. the UAARSI of the refueling aircraft), while limiting the effects of frame violations. Stated another way, the focus distance is selected to provide a greater comfort whereas the convergence point 310 is selected to prevent objects of interest from moving in "front" of the mid-window.

In the exemplary system described above, apertures 304 may be located approximately halfway between eyepiece 302 and display 306 in each module 312. In such embodiments, mid-window 308 will appear approximately 13 inches from the observer's eyes, or about two inches in front of the convergence point. Because the convergence distance and the midwindow 310 are selected such that no objects will appear in front of the midwindow, and because the mid-window 308 appears in front of convergence point 310, the user is provided with a powerful visual cue resembling a standard viewing window, with all elements in the viewed scene appearing through the window. Moreover, because the user is looking "through" the virtual window, the "mid-window" appears naturally blurred, further enhancing the effect of the window. Again, the particular dimensions of actual implementations may vary dramatically from those set forth in this illustrative example.

Aperture 304 may be appropriately sized and located to function with any type of electronic display, including conventional flat panel or CRT displays. In an alternate embodiment to display 300 shown in FIG. 3, a stereoscopic image is presented on a single display using currently known or subsequently developed methods, with left and right eye image pairs separated by any technique (e.g. using different polarization states, colors, etc). A single aperture may be provided at any spatial location between the display and the viewer(s) such that the edges of the display are obscured. Aperture 304 may be located very close to the edge of the display, for example, such that the display itself appears as a "window" to the viewer that obscures frame violations as discussed above. Accordingly, the techniques and structures described herein may be readily modified for adoption in a wide range of equivalent embodiments.

While at least one exemplary embodiment has been presented in the foregoing detailed description, a vast number of equivalent variations exist. While the invention has been primarily described in the context of a real-time video system, for example, the concepts described herein could be readily applied to many equivalent display environments such as displays of computer-generated imagery, still photographs, holographic images or any other type of digital or analog content. Moreover, the invention is not limited to aerial refueling uses, but rather encompasses a wide range of equivalent applications such as video games and other forms of entertainment, simulations, motion pictures, industrial automation, aerospace applications and any other applications of stereoscopic imagery. It should also be appreciated that the exemplary embodiment(s) presented herein are only examples, and are not intended to limit the scope, applicability, or configuration of the invention in any way. Rather, the foregoing detailed description will provide those skilled in the art with a convenient road map for implementing the exemplary embodiment or embodiments. It should be understood that various changes can be made in the function and arrangement of elements without departing from the scope of the invention as set forth in the appended claims and the legal equivalents thereof.

What is claimed is:

1. A method of producing a stereoscopic image of a scene on a stereoscopic display for an observer, the method comprising the steps of:
    obtaining a left video signal and a right video signal of the scene;
    processing the left video signal and the right video signal to generate left stereoscopic image data and right stereoscopic image data;
    displaying a left stereoscopic image on the stereoscopic display such that the left stereoscopic image appears at a viewing surface;
    displaying a right stereoscopic image on the stereoscopic display such that the right stereoscopic image appears at the viewing surface; and
    obscuring at least a portion of the left stereoscopic image from the observer with a left aperture located between a left eyepiece and the stereoscopic display, and obscuring at least a portion of the right stereoscopic image from the observer with a right aperture located between a right eyepiece and the stereoscopic display, to thereby prevent frame violation effects in the stereoscopic image, such that displayed objects intended to appear in front of the viewing surface are not blocked by an edge of a display frame.

2. The method of claim 1 wherein the stereoscopic display comprises left and right modules having a display convergence point corresponding to the intersection of centerlines projecting from the left and right modules.

3. The method of claim 2 wherein the processing step comprises generating a focus point for the stereoscopic image that is distinct from the display convergence point.

4. The method of claim 1 wherein the left video signal is produced by a left camera, and the right video signal is produced by a right camera.

5. The method of claim 4 wherein the left camera and the right camera are configured with a convergence point for the left video signal and the right video signal.

6. The method of claim 5 wherein the convergence point is located closer to the left camera and the right camera than a closest object appearing in the scene.

7. A method of producing a stereoscopic image of a scene on a stereoscopic display for an observer, the method comprising the steps of:
    obtaining a left video signal and a right video signal of the scene;
    processing the left video signal and the right video signal to generate left stereoscopic image data and right stereoscopic image data;
    displaying a left stereoscopic image on a left stereoscopic video display;
    displaying the right stereoscopic image on a right stereoscopic video display;
    blocking at least a portion of the perimeter of the left stereoscopic video display from the observer with a left aperture located between a left eyepiece and the left stereoscopic video display, and blocking at least a portion of the perimeter of the right stereoscopic video display from the observer with a right aperture located between a right eyepiece and the right stereoscopic video display to thereby prevent blocking of a first displayed object in the stereoscopic image by a second displayed object in the stereoscopic image that is intended to appear behind the first displayed object.

8. A method of producing a stereoscopic image of a scene on a stereoscopic display for an observer, the method comprising the steps of:

obtaining a left video signal and a right video signal of the scene;

processing the left video signal and the right video signal to generate left stereoscopic image data and right stereoscopic image data;

displaying a left stereoscopic image on a left stereoscopic display such that the left stereoscopic image appears at a stereoscopic viewing surface and within a stereoscopic viewing window having a perimeter;

displaying a right stereoscopic image on a right stereoscopic display such that the right stereoscopic image appears at the stereoscopic viewing surface and within the stereoscopic viewing window; and obscuring at least a portion of the perimeter of the left stereoscopic display from the observer with a left aperture located between a left eyepiece and the left stereoscopic display, and obscuring at least a portion of the perimeter of the right stereoscopic display from the observer with a right aperture located between a right eyepiece and the right stereoscopic display to thereby prevent frame violations in the stereoscopic image; wherein frame violations occur when objects intended for display behind the stereoscopic viewing surface are displayed in a manner that makes the objects appear in front of the stereoscopic viewing surface.

* * * * *